(No Model.) 3 Sheets—Sheet 1.

G. T. WARWICK.
SADDLE FOR VELOCIPEDES.

No. 416,697. Patented Dec. 3, 1889.

Witnesses:
J. D. Garfield
Wm. F. Bellows

Inventor:
Geo. T. Warwick
by Chapin
Attorneys (No Model.) 3 Sheets—Sheet 2.
G. T. WARWICK.
SADDLE FOR VELOCIPEDES.
No. 416,697. Patented Dec. 3, 1889.
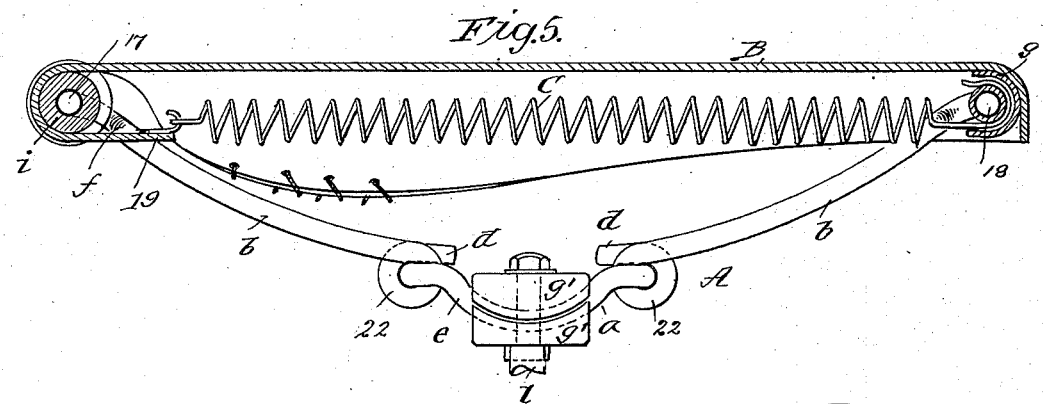
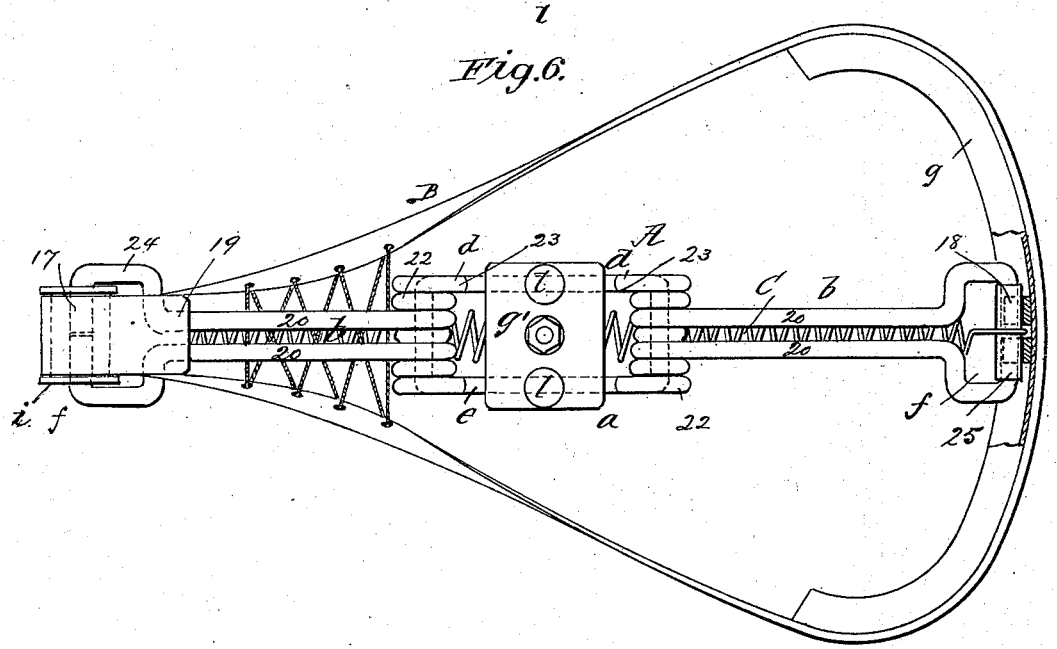
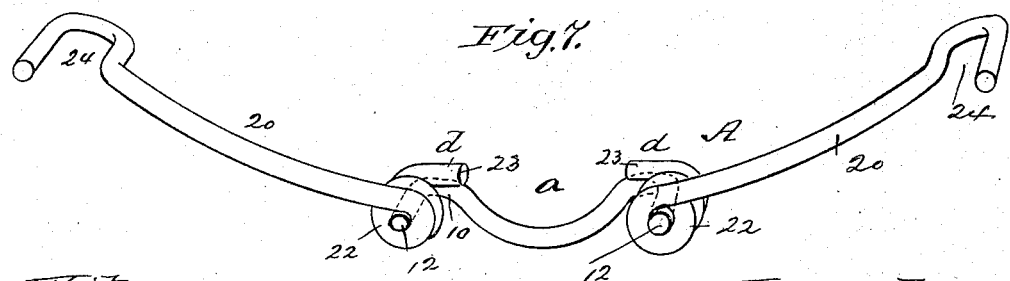

(No Model.) 3 Sheets—Sheet 3.
G. T. WARWICK.
SADDLE FOR VELOCIPEDES.
No. 416,697. Patented Dec. 3, 1889.
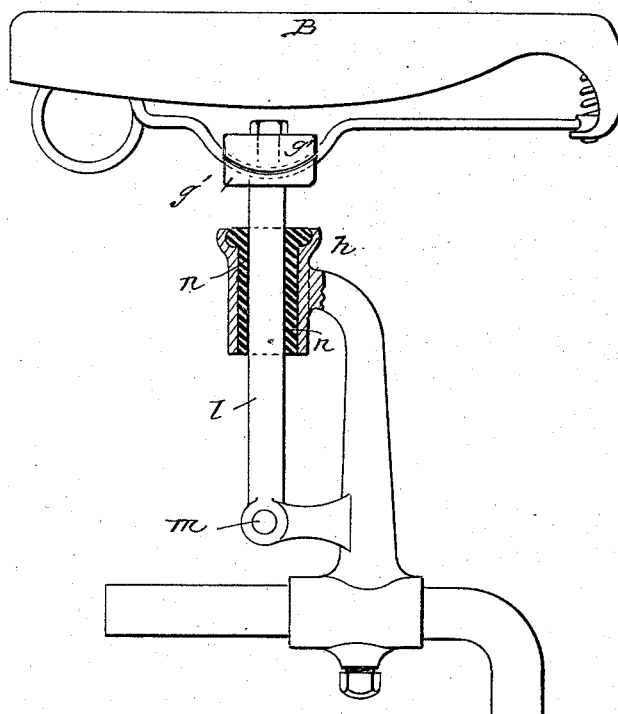
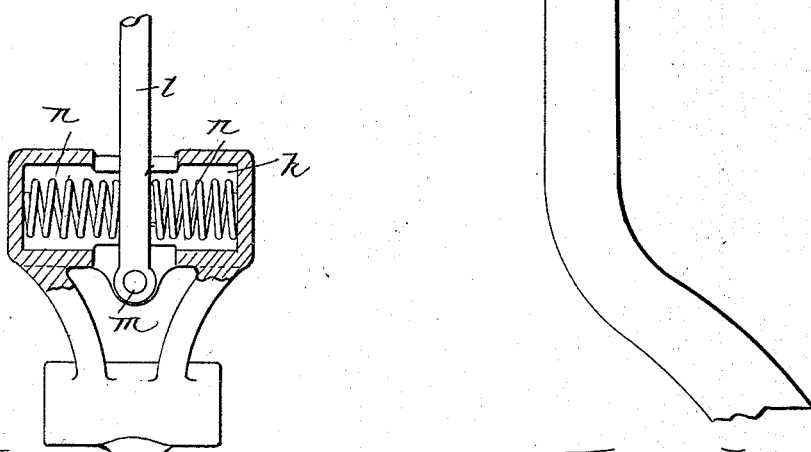

UNITED STATES PATENT OFFICE.

GEORGE T. WARWICK, OF SPRINGFIELD, MASSACHUSETTS, ASSIGNOR TO THE WARWICK CYCLE MANUFACTURING COMPANY, OF SAME PLACE.

SADDLE FOR VELOCIPEDES.

SPECIFICATION forming part of Letters Patent No. 416,697, dated December 3, 1889.

Application filed June 25, 1889. Serial No. 315,556. (No model.)

*To all whom it may concern:*

Be it known that I, GEORGE T. WARWICK, a subject of the Queen of Great Britain, residing at Springfield, in the county of Hampden and State of Massachusetts, have invented new and useful Improvements in Saddles for Velocipedes, of which the following is a specification.

This invention relates to improvements in saddles for velocipedes, the purpose thereof being to provide means in the saddle whereby it is capable of yielding under the varying pressures and shocks that may be imparted thereto in riding, whereby the comfort and safety of the rider are increased, and whereby under such construction the saddle itself is of increased durability and is at all times maintained in its proper shape, all tendencies thereof to warp and sag being provided for; and the invention consists in the construction and combination of the various parts, all substantially as will hereinafter more fully appear, and be set forth in the claims.

Figure 1:
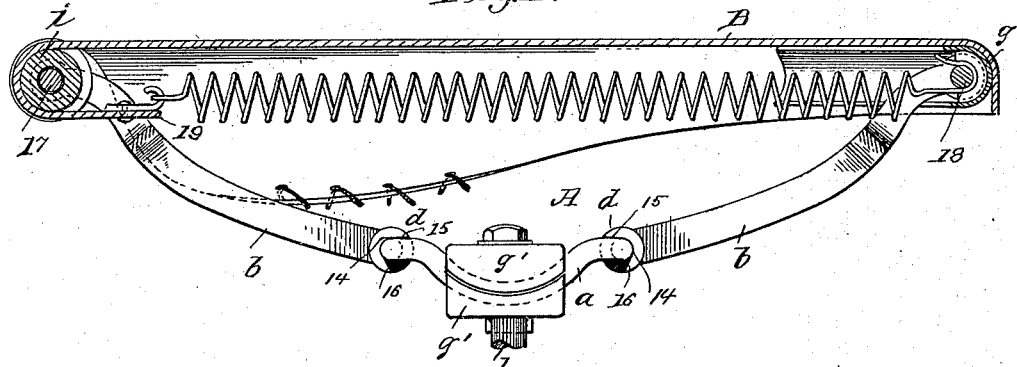
Figure 2:
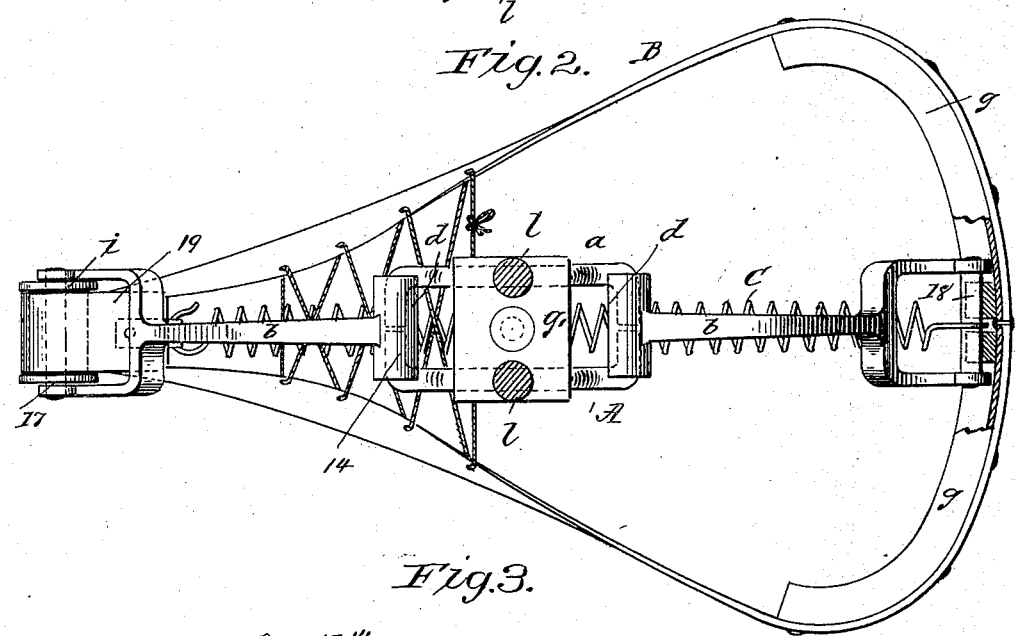
Figure 3:
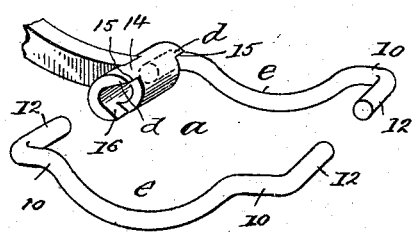
Figure 4:
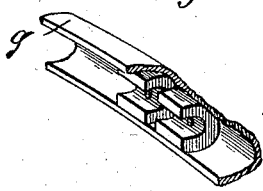

In the drawings forming part of this specification, Figure 1 is a central vertical longitudinal sectional view of my improved saddle. Fig. 2 is a plan view of the under side of the same, parts thereof being, however, shown as broken away and in section. Figs. 3 and 4 are perspective views of details comprised in the constructions shown in the above-named figures, to be hereinafter referred to. Figs. 5 and 6 are views similar to Figs. 1 and 2, respectively, illustrating a saddle of substantially the same construction, but having the form of some of its parts somewhat modified; and Fig. 7 is a perspective view in detail. Figs. 8 and 9 are views in detail to be hereinafter particularly referred to.

The saddle comprises a lower frame A of a bowed or shallow U form, which by the central portion thereof is attached to or supported from the saddle-post or other suitable part of the velocipede-frame. The seat B of the saddle is by its ends supported on the extremities of said lower bowed frame, one thereof being movable and guided thereon, and a spring C by its one end is attached to the movable end of the seat, its other being attached to a suitable part of the saddle-frame. The said lower frame consists, preferably, and as shown in Figs. 1 and 2, of three members—an intermediate holder $a$, constituting the support proper for the saddle, and arms $b\ b$, jointed thereto, capable of swinging by their outer ends downwardly, but normally held by the contractive power of the said spring against a limiting abutment $d$ provided therefor between each of said arms and said holder, whereby an undue upward movement of said arms is prevented. The said intermediate holder $a$, as shown, consists of a pair of bars $e\ e$, intermediately of arc shape, having forward and rearward horizontal extensions 10 and inward projections 12, forming studs, the ends of which are separated from each other, and said stud projections fit into and form pivotal supports for the socket, which is formed on the inner end of each of said arms $b\ b$. As shown in Figs. 1 and 3, each end is formed with a cross-bar 14, the wall of which at each end thereof is cut out, the upper edge 15 of said cut-out part forming the said abutment to limit the upward swing of the arm by bearing on the horizontal portion of said holder-bars, while the lower edge 16 of said cut-out wall is located at such a distance from the under side of said horizontal portion 10 as to permit of the desired swing downwardly of said arm. Each of said arms at its outer end is forked or of stirrup form, as shown at $f$, between the bifurcated members of which are cross pins or studs 17 18. On the forward cross-pin 17 is mounted a roller $i$. The saddle-seat B, of leather or equivalent flexible material, is firmly fixed to the outer end of one of said forked arms, usually the rear one, there being applied intermediately of said arm extremity and the seat a metallic stiffening-plate $g$, of U shape in cross-section, and in its length bent into a semi-elliptical form corresponding to the shape desired for the rear end of the seat. Said seat thence converges forwardly to the peak of the saddle, its end being passed around the pin 17 on the forward bifurcated end of the arm, (or in practice, when the roller is provided, around the latter,) and to a return-bend 19 thereof one end of the spiral spring C is connected, its other end being secured to the cross-pin 18 between the bifurcated portions of the rear arm $b$ or to other suitable rearward or intermediate part of the saddle-frame.

$g'$ $g'$ represent a pair of clamping-blocks, having within their adjacent surfaces grooves to accommodate the central portions $e$ of the holder $a$, said blocks being confined the one upon the other and against the said holder by one or more bolts and nuts.

In the drawings, Figs. 5, 6, and 7, a modified construction in the lower frame A is shown, which consists in detail only, and not in essential elements. The holder $a$ is of the same form as that already described. The arms $b$ $b$ each comprise two members 20 20, ranging substantially parallel, each at its inner end terminating in one or more coils 22 to form a socket-eye for the stud 12 of the holder, the extremity of each coil being inwardly projected, as shown at 23, to form the abutment $d$ by its bearing on the horizontal extension 10 of the said holder, and the outer end of each of said arm members 20 is bent twice at right angles, as shown at 24, to form half of the stirrup, and the inwardly-projecting extremities of the outer end of the forward arm $b$ support the roller 18, while the corresponding extremities of the rearmost arm $b$ are united by a sleeve 25. The said double members of each arm just described are held together by the clamped parts of the holder $a$, and of course, if deemed necessary or advantageous, ties or clips may be provided near the outer ends of said duplicate arm members for increased security thereof in their proper adjacent dispositions.

The saddle is to be supported on the frame of the velocipede in any suitable manner, either to the backbone of the "ordinary" bicycle or to the saddle-post of a "safety" bicycle or tricycle, and in Fig. 8 is shown an improved means of mounting and supporting a saddle on or from a velocipede-frame, which consists in providing a socketed hub $h$ or other suitable form of cushion-receiver on the saddle-post or other appropriate part formed on or attached to the frame of the machine, through which receiver is passed the downwardly-projecting vertical spindle $l$, (or spindles where two are employed, as is often the case,) which is formed as the lower supporting part of the saddle. The said spindle by its lower end and below said cushion-receiver is supported from the frame, preferably, by being connected by a pivotal joint, as shown at $m$, whereby it may have a vibration longitudinally of the machine, but none laterally. Between the inner walls of the said receiver and the spindle are interposed cushions $n$, the same as shown, consisting of a sleeve or rubber, which entirely surrounds the spindle and through which the latter is passed.

As indicated in the view Fig. 9, the cushioning device for the spindle may consist of spiral springs acting against opposing sides of the spindle.

From the construction hereinbefore described the seat has capabilities as follows: The seat B is always held longitudinally in tension by the application of the spring C, as described, and capable of yielding in the manner of a seat-cushion under the weight of the rider, and such yielding of the seat causes a drawing on the spring, the recoil of which tends to maintain the seat taut and level. The spring is of such rigidity that in its application, as described in relation to the articulated members of the frame A, the arms $b$ $b$ are, even when under the weight of the rider, normally held in their upwardly-limited disposition shown, and as if made an integral part of the frame; but in the event of a violent concussion, whereby increased stress occasioned by the weight on the saddle is imposed on either the forward or rearward portion of said saddle, the arm $b$ of the frame toward the end receiving such increased thrust or pressure is swung downwardly against the recoil of the said spring, to be immediately, however, after the shock drawn back to its uppermost disposition.

It is not incumbent under this invention to joint both the forward and rearward arms $b$ on the central lower portion of the frame A, as described, for the same results are obtained in a degree where, for instance, only the forward arm is formed articulated and capable of the swinging motion described; but for the highest degree of excellence obtainable it is preferable to impart the yielding and swinging capabilities to both arms of the frame.

The provision of the cushion or cushions on the frame or saddle-post, which bears on the pending spindle of the saddle, is a most useful device, serving in a great measure to render insignificant the vibration of the saddle-post or other parts of the frame, which vibration would otherwise be imparted to the saddle and be felt by and much to the annoyance of the rider.

What I claim as my invention is—

1. A saddle-frame consisting of a central holder portion and forward and rearward arms, each upwardly extended, one or both thereof being jointed to swing on said holder portion, each swinging arm provided with an abutment to limit its upward swing, and a spring applied to each of said swinging arms to normally maintain it in its uppermost disposition, substantially as described.

2. A saddle-frame consisting of a central holder portion and forward and rearward arms, each upwardly extended, one or both thereof being jointed to swing on said holder portion, each swinging arm provided with an abutment to limit its upward swing, and a spring applied to each of said swinging arms to normally maintain it in its uppermost disposition, combined with a flexible seat supported on said frame, substantially as described.

3. A saddle-frame consisting of a central holder portion and forward and rearward arms, each also upwardly extended, one or both thereof being jointed to swing on said holder portion, and each swinging arm provided with an abutment to limit its upward swing, combined with a flexible seat by one end attached to one end of said frame and by its other end passed and guided for movement over and around the end portion of said frame, and a spring by one end attached to said movable end of the seat and by its other end attached to the frame, substantially as described.

4. The combination, with a central holder provided with the studs 12 12, of the arms $b\,b$, having in one end transverse sockets fitting over said studs and having abutments to limit the upward swing of said arms, said arms at their outer ends being forked and having cross-pins, the flexible seat by its one end supported on the outer end of one of said arms and by its other end passed and movably guided over and partially around the cross-pin of the other of said arms, and a spring by one end secured to the movable end of said flexible saddle and thence projected and connected to the other end of the saddle-frame, substantially as described.

5. The combination, with the holder $a$, comprising the pair of bars $e$, having the angularly-projecting studs 12 12 and the clamping-blocks $g'\,g'$ for confining said holders, of the arms $b\,b$, each having at one end a socket to fit on said studs and provided with an abutment to limit the upward swing of said arms, a spring applied to each arm and acting to maintain it in its uppermost disposition, and a seat supported on the upper ends of said arms, substantially as set forth.

6. The combination, with the velocipede-frame provided with the holder having therein one or more cushions, of the saddle provided with the supporting-spindle pending therefrom, passed through between said cushions, and supported therebelow on said frame, substantially as described.

GEO. T. WARWICK.

Witnesses:
 WM. S. BELLOWS,
 H. A. CHAPIN.